MINIATURE GEAR MECHANISM

Original Filed July 16, 1962 2 Sheets-Sheet 1

Inventors:
William S. Caley,
Jack D. Harshman,
by Hood, Lustig & Drish.
Attorneys.

MINIATURE GEAR MECHANISM

Original Filed July 16, 1962 2 Sheets-Sheet 2

Inventors:
William S. Caley,
Jack D. Harshman,
by Hood, Gust & Irish
Attorneys.

United States Patent Office

Re. 25,960
Reissued Feb. 22, 1966

25,960
MINIATURE GEAR MECHANISM

William S. Caley and Jack D. Harshman, Fort Wayne, Ind., by Bowmar Instrument Corporation, assignee Original No. 3,154,963, dated Nov. 3, 1964, Ser. No. 209,836, July 16, 1962. Application for reissue Aug. 13, 1965, Ser. No. 491,068
18 Claims. (Cl. 74—421)

Matter enclosed in heavy brackets [ ] appears in the original patent but forms no part of this reissue specification; matter printed in italics indicates the additions made by reissue.

This invention relates generally to speed-reducing gear mechanisms, and more particularly to miniature precision speed-reducing gear mechanisms adapted for use with miniature servo motors and the like.

In computer and air-borne instrumentation and control technologies, it is frequently necessary to provide a speed reduction between a driving motor and the device driven thereby, a common instance is the necessity for gearing-down the output shaft rotational speed of a servo motor. In these technologies, the present trend is increasingly toward miniaturization, and it is thus necessary that such speed reducing gear mechanisms be extremely small in size and constructed with great precision.

United States Patent No. 2,936,644 discloses a miniature speed-reducing gear mechanism wherein a maximum number of different speed reduction ratios may be provided with a minimum number of different gear cluster combinations by the employment of a potential maximum of six gear cluster shafts having equal spacing from each other and from the axial center line of the mechanism. In the design of miniature speed-reducing gear mechanisms, it is frequently desirable that the overall assembly be axially as short as possible and that the output shaft and output gear be capable of withstanding the greatest possible radial loading. It is further desirable that the mechanism be characterized by its simplicity and ease of manufacture and assembly while retaining the advantages of the equal centering feature of the aforementioned Patent No. 2,936,644. In particular, it is highly desirable that the output shaft together with its supporting bearings and the output gear be capable of assembly as a unit from the exterior of the mechanism in contrast with prior constructions wherein at least the output shaft and output gear were required to be assembled through the interior of the mechanism.

It is accordingly an object of the invention to provide an improved miniature speed-reducing gear mechanism.

Another object of the invention is to provide an improved miniature speed-reducing gear mechanism wherein the output shaft together with its bearings and the output gear are assembled as a unit from the exterior of the mechanism.

A further object of the invention is to provide an improved miniature speed-reducing gear mechanism characterized by its short overall axial length, simplicity and ease of manufacture and assembly, and by the ability of the output shaft and gear to withstand greater radial loading than has heretofore been provided.

Further objects and advantages of the invention will become apparent by reference to the following description and the accompanying drawing, and the features of novelty which characterize the invention will be pointed out with particularity in the claims annexed to and forming a part of this specification.

The invention in its broader aspects provides a miniature gear mechanism comprising a housing having shell means and end wall means joined to the shell means and forming a first cavity therewith. The end wall means has an exterior surface and an interior surface which faces the first cavity. The end wall means has a second cavity formed in its interior surface and communicating with the first cavity and a third cavity formed in its exterior surface and communicating with a second cavity. A gear train is disposed in the first cavity and includes a final shaft having one end extending into the second cavity. First bearing means is provided supporting the final shaft at a point spaced from the one end thus defining an outboard portion of the final shaft between the first bearing means and the one end. The outboard portion of the final shaft has first gear means thereon in the second cavity. An output shaft is provided in the third cavity and extending outwardly beyond the exterior surface of the end wall means, the output shaft having second gear means thereon meshing with the first gear means and driven thereby. Second bearing means are provided in the third cavity supporting the output shaft.

In the preferred embodiment of the invention, the third cavity is proportioned to permit insertion therein of the second bearing means and output shaft with the second gear means thereon from the exterior surface of the end wall means.

Figure 1:
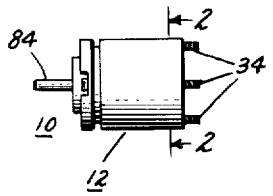
FIG. 1 is a side elevational view of a gear head incorporating the invention.
Figure 2:
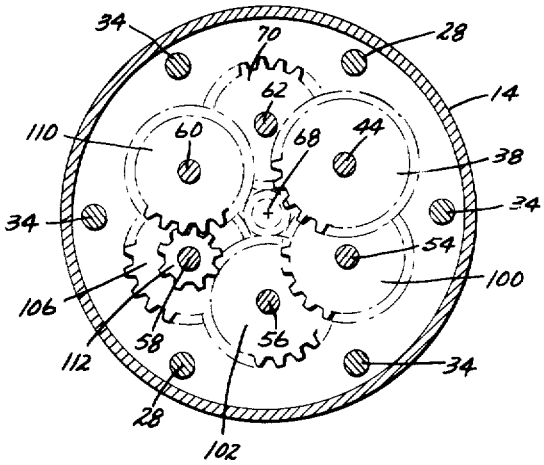
FIG. 2 is a cross-sectional view taken along the line 2—2 of FIG 1.
Figure 3:
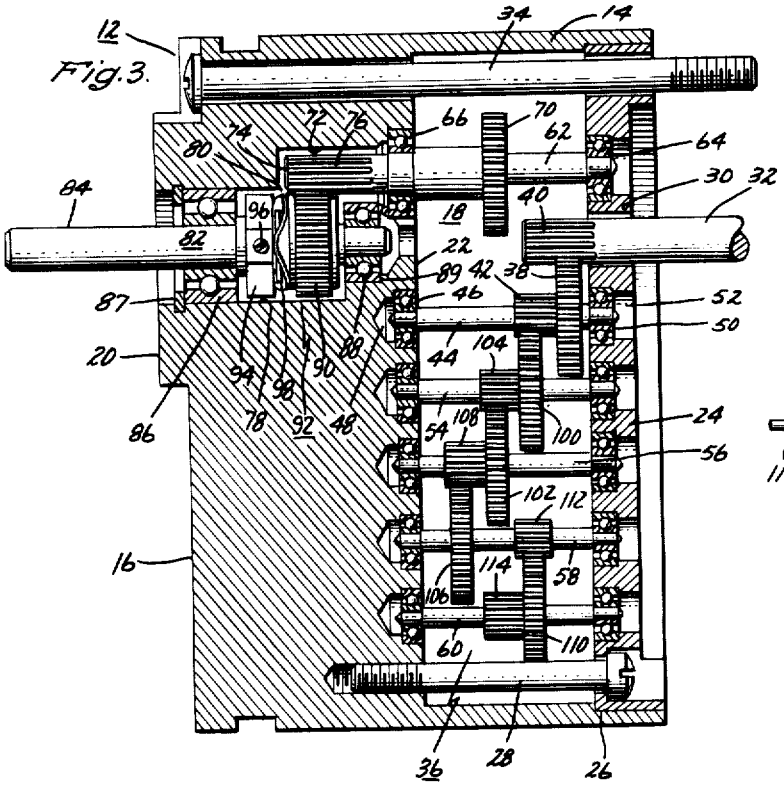
FIG. 3 is a diagrammatic "stretch-out" cross-sectional view of the gear head of FIGS. 1 and 2.

Referring now to FIGS. 1, 2, and 3 of the drawing, there is shown a gear head, generally identified at 10, having a housing 12. Housing 12 comprises a shell portion 14, shown here as being cylindrical in cross-section, integrally joined to end wall portion 16 and defining cavity 18 therewith. End wall 16 has an exterior surface 20 and an interior surface 22 which faces cavity 18. A bearing plate 24 is provided extending across shell portion 14 and spaced axially from interior surface 22 of end wall 16 thereby closing the cavity 18; bearing plate 24 is seated in a suitable annular recess 26 in the inner surface of shell portion 14 and is retained in assembled position by a plurality of bolts 28 threaded into tapped openings in the interior surface 22 of end wall 16, as shown.

Bearing plate 24 has a coaxial opening 30 formed therein through which input shaft 32 is adapted to extend into the cavity 18. In the illustrated embodiment, input shaft 32 is not part of the gear head 10, but rather is a part of the driving apparatus which may be a servo motor. In the illustrated embodiment, the gear head 10 is secured to the driving apparatus by means of suitable through-bolts 34 which extend through openings in the end wall portion 16 and bearing plate 24.

A gear train 36 is disposed in cavity 18 and in the illustrated embodiment comprises six gear clusters each comprising a gear and pinion mounted on a shaft. The input gear cluster comprises a gear 38 meshing with input pinion 40 cut in the input shaft 32, and a pinion 42 both mounted on the gear cluster shaft 44. Shaft 44 extends axially across cavity 18 with one end supported in a suitable anti-friction bearing 46 mounted in a bearing pocket 48 formed in interior surface 22 of end wall 16, and its other end supported in [ainti-friction] *anti-friction* bearing 50 mounted in bearing pocket 52 in bearing plate 24. The intermediate gear cluster shafts 54, 56, 58, and 60 similarly extend axially across cavity 18 with their ends respectively supported in bearings mounted in bearing pockets in the interior surface 22 of the end wall 16 and in bearing plate 24. The intermediate gear cluster shafts 54, 56, 58 and 60 each have a gear and pinion thereon respectively meshing with the pinion and gear of the next higher and next lower speed cluster.

The final gear cluster shaft 62 extends axially across cavity 18 and has its outer end supported by bearing 64 mounted in a bearing pocket in the bearing plate 24. The other end of the final gear cluster shaft 62 is supported by bearing 66 as will be hereinafter more fully described.

Referring now particularly to FIG. 2, it will be seen that the centers of the gear cluster shafts 44, 54, 56, 58, 60, and 62 are equally spaced from each other and from the axial center line 68 of input shaft 32. While in the illustrated embodiment, a total of six gear clusters are shown, it will be readily understood that a minimum of one cluster may be provided with input pinion 40 meshing directly with gear 70 on final shaft 62, or any intermediate number of clusters may be provided in order to provide the desired speed reduction ratio. As more fully described in the aforementioned Patent No. 2,936,644, the provision of the equal center distances between the gear cluster shafts and the axis of the input shafts permits obtaining the maximum number of speed-reduction ratios with a minimum number of different gear cluster combinations.

End wall 16 has a cavity 72 extending axially inwardly from interior surface 22 and coaxial with final gear cluster shaft 62. The end 74 of final gear cluster shaft 62 extends into gear cavity 72 and bearing 66 is mounted in the opening of cavity 72 and supports shaft 62 at a point spaced from end 74 thereby defining an outboard portion of shaft 62 in cavity upon which output pinion 76 is formed.

Another cavity 78 is formed in end wall 16 extending axially inwardly from exterior surface 20 coaxial with center line 68 of the input shaft 32; cavity 72 communicates with cavity 78 intermediate its ends, as at 80.

An output shaft 82 is provided disposed coaxially within cavity 78 and having a portion 84 extending outwardly beyond exterior surface 20 of end wall 16. Output shaft 82 is rotatably supported by suitable anti-friction bearings 86 and 88 mounted in cavity 78 in axially spaced-apart relationship on either side of the opening 80 communicating between cavity 72 and cavity 78.

Output shaft 82 has an output gear 90 thereon between bearings 86 and 88 and meshing with pinion 76 through the opening 80. Output gear 90 may be directly secured to output shaft 82 in order to drive the same, however, in the illustrated embodiment, output gear 90 is rotatably mounted on shaft 82 and drives output shaft 82 through a slip clutch assembly 92. The slip clutch assembly 92 comprises a member 94 secured to the output shaft 82, as by a set screw 96, and an undulated annular flat spring 98 positioned between member 94 and output gear 90 and resiliently engaging their respective radial faces. Spring 96 normally exerts a predetermined axial force on the radial faces of member 94 and gear 90 thereby to provide a driving action between the gear 90 and member 94 and in turn to shaft 82, however, it will be seen that the output gear 90 will slip with reference to the spring 98 and the member 94 when a predetermined load is applied to the output shaft 82.

It will be seen that the cavity 78 in end wall portion 16 is proportioned to permit insertion of the entire output shaft, output gear slip clutch and bearing assembly from exterior surface 20. Thus, bearings 86 and 88, output gear 90, slip clutch 92 and spring 98 are preassembled on output shaft 82, and the assembly is then inserted in cavity 78 with bearing 88 engaging shoulder 89 and output gear 90 meshing with pinion 76. The assembly is then retained within cavity 78 by means of a suitable snap ring 87.

It will be observed that in accordance with the invention, the output gear 90 is supported between the bearings 86, 88 thus permitting the output shaft 82 to accommodate greater radial loading than has heretofore been possible with a cantilevered output gear, i.e. an output gear mounted on an outboard portion of the output shaft. It will further be seen that the construction facilitates assembly of the device since the entire output shaft assembly is assembled from the exterior of the device rather than partially from the interior as has heretofore been the case. It will finally be seen that the construction permits the provision of an axially shorter unit while still retaining the desirable feature of equal center distances between the gear cluster shafts.

It will be seen that each of the gear cluster shafts 54, 56, 58 and 60 has a pinion and gear thereon, the pinions and gears intermeshing to drive shaft 62 from input shaft 30 with a predetermined speed-reduction ratio. In the illustrated embodiment, gear 100 on shaft 54 meshes with pinion 42 on shaft 44, gear 102 on shaft 56 meshes with pinion 104 on shaft 54, gear 106 meshes with pinion 108 on shaft 56, gear 110 meshes with gear 112 on shaft 58, and gear 70 on shaft 62 meshes with pinion 114 on shaft 60.

Figure 4:
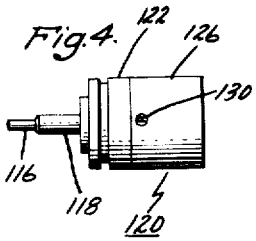
FIG. 4 is a side elevational view of a speed-reducer incorporating the invention and having concentric input and output shafts.
Figure 5:
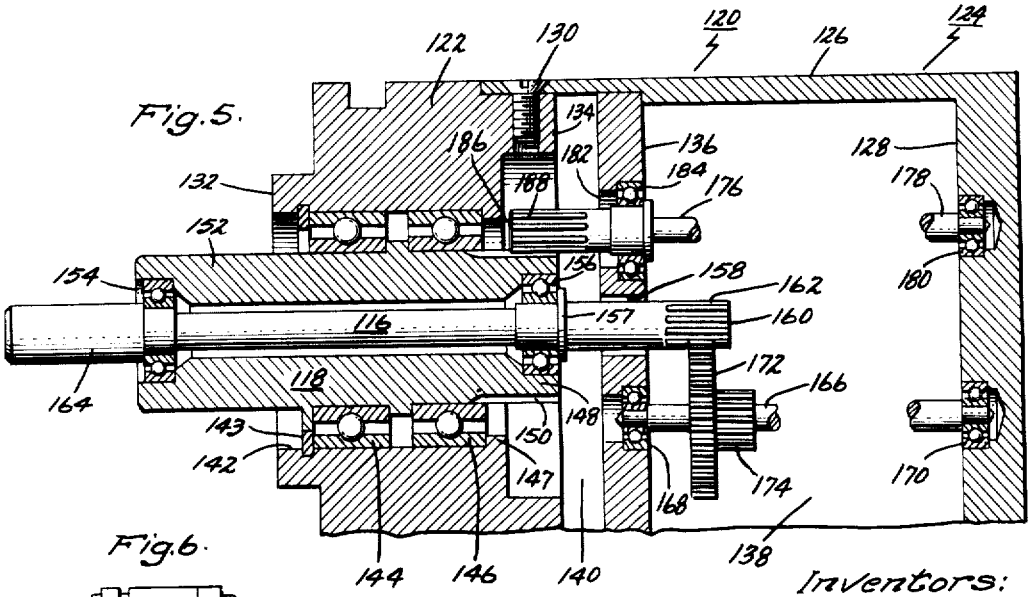
FIG. 5 is a fragmentary diagrammatic "stretch-out" cross-sectional view of the speed-reducer of FIG. 4.

Referring now to FIGS. 4 and 5 there is shown an embodiment of the invention incorporated in a speed reducer having concentric input and output shafts 116 and 118. Here, a housing 120 is provided having a first end wall 122, and an integral end cap 124 having a shell portion 126 and a second end wall portion 128. It will be seen that the open end of shell portion 126 is secured to end wall 122 in any suitable manner, as by screws 130, and defines a cavity therewith.

End wall 122 has an exterior surface 132 and an [interior] *interior* surface 134. A bearing plate 136 extends transversely across shell portion 126 defining a first cavity section 138 with end wall section 128 and a second cavity section 140 with interior surface 124 of end wall 122.

An opening 142 is formed in the exterior surface 132 of end wall 122 and extends axially inwardly to communicate with cavity section 140. Output shaft 118 is coaxially positioned within opening 142 and is rotatably supported therein by suitable anti-friction bearings 144 and 146. The inner end 148 of output shaft 118 extends into cavity section 140 and has an output gear 150 formed thereon. The outer end 152 of the output shaft 118 extends axially outwardly beyond exterior surface 132 of end wall 122.

Input shaft 116 is rotatably supported within the tubular output shaft 118 by means of suitable anti-friction bearings 154 and 156, being retained in assembled relation by a suitable snap ring 157. An opening 158 is formed through bearing plate 136 coaxial with input shaft 116 and communicating between cavity sections 138, and 140. Inner end 160 of input shaft 116 extends through opening 158 into cavity section 138 and has an input pinion 162 formed thereon. The outer end 164 of input shaft 116 extends axially outwardly beyond end 152 of output shaft 118.

A gear train to provide the desired speed reduction ratio is provided in cavity 138 with its shafts extending axially between bearing plate 136 and end wall portion 128. The initial gear cluster shaft 166 of the gear train has its end respectively journaled in suitable anti-friction bearings 168 and 170 mounted in bearing plate 136 and end wall 128 respectively. Input gear 172 on gear cluster shaft 156 meshes with input pinion 162 and pinion 174 meshes with a successive gear of the gear train (not shown).

The final shaft 176 of the gear train has one end 178 journaled in anti-friction bearing 180 in the end wall portion 128. An opening 182 is formed through bearing plate 136 communicating between cavity sections 138 and 140. Bearing 184 is mounted in opening 182 and supports final gear cluster shaft 176 with its end 186 extending into cavity 140 and having outboard pinion 188 formed thereon and meshing with gear 150 on output shaft 118.

It will be readily understood that the gear train in cavity section 138 interconnecting input shaft 116 and the final gear cluster shaft 176 may be of the type shown in FIGS. 2 and 3, i.e. with the gear cluster shafts respectively having their axes disposed on a circle and spaced apart by distances equal to the radius of the circle, the center of the circle being coincident with the axis of the input shaft 116. It will also be readily seen that any other conventional form of gear train may be provided in the gear section 138 interconnecting input pinion 162 and the final gear cluster shaft 176.

In accordance with the invention, the opening 142 in the end wall 122 is proportioned to permit insertion of the entire input and output shaft assembly from the exterior surface 132. Thus, the output shaft 118 and bearings 154, 156 are preassembled on the input shaft 116, the bearings 144 and 146 are then preassembled on the output shaft 118 and the resulting assembly is then inserted on opening 142 from exterior surface 132 with bearing 146 engaging shoulder 147, with gear 150 meshing with pinion 188, and with pinion 162 meshing with gear 172. The input and output shaft assembly is then retained within opening 142 by means of a suitable snap ring 143.

Figure 7:
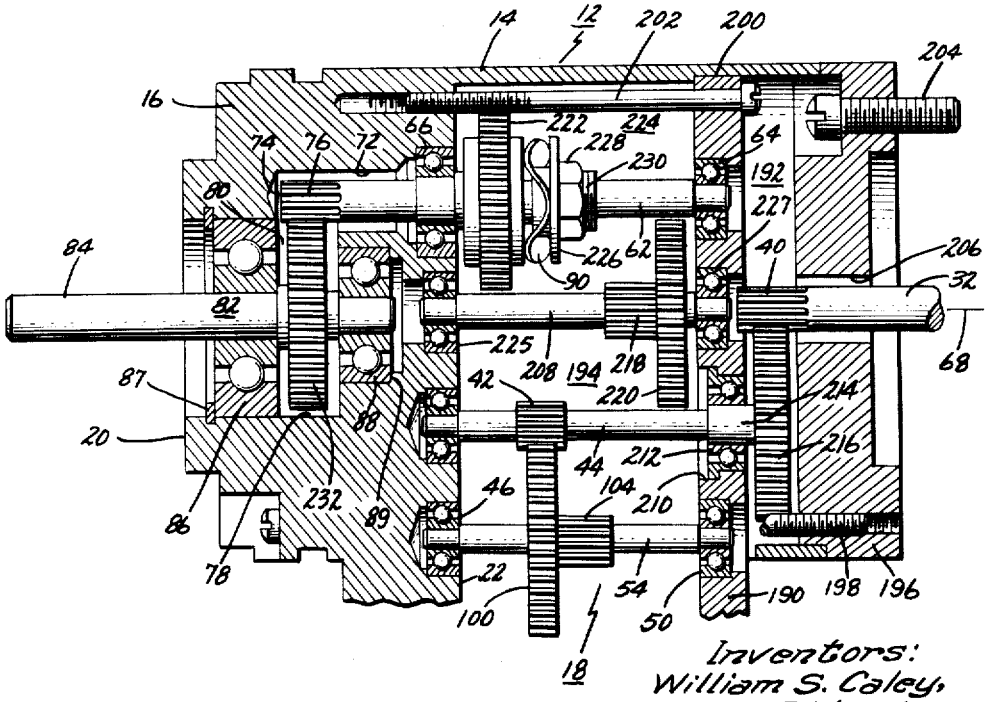
FIG. 7 is a fragmentary diagrammatic "stretch-out" cross-sectional view of the embodiment of FIG. 6.
Figure 6:
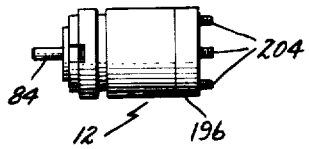
FIG. 6 is a side-elevational view of another embodiment of the invention adapted to provide an extremely high speed reduction ratio.

Referring now to FIGS. 6 and 7, the invention is shown embodied in a gear head adapted to provide an extremely high gear reduction ratio by virtue of the provision of an additional gear cluster in the gear train, i.e. a total of seven gear clusters as opposed to a maximum of six previously provided.

Here, with like reference numerals indicating like elements, housing 12 is integrally formed of shell portion 14 and end wall portion 16 defining cavity 18 with shell portion 14. End wall portion 16 has an exterior surface 20 and an interior surface 22 facing cavity 18. Bearing plate 190 extends across shell portion 14 intermediate interior surface 22 and the open end of the shell portion 14, and divides cavity 18 into a first cavity section 192 and a second cavity section 194. A motor adapter plate 196 is secured to the open end of shell portion 14 by means of suitable through-bolts 198 extending through end wall portion 16, cavity section 194, bearing plate 190 and cavity section 192, motor adapter plate 196 closing the cavity section 192.

Bearing plate 190 is seated in recess 200 in shell portion 14 and is held in assembled position by through-bolts 202 threaded into end wall portion 16, as shown. Motor adapter plate 196 is provided with suitable bolts 204 for securing the gear head to the driving mechanism, such as a servo motor.

Motor adapter plate 196 has a coaxial center opening 206 formed therethrough communicating with cavity section 192 and through which input shaft 32 coaxially extends. Input pinion 40 is formed on the end of input shaft 32 within cavity section 192. A gear train of the type shown in FIGS. 2 and 3 but with an additional gear cluster shaft coincident with axis 68 of input shaft 132 is positioned in cavity section 194; only initial gear cluster shaft 44, intermediate gear cluster shaft 54, final gear shaft 62, and the seventh gear cluster shaft 208 are shown, it being understood that the three further intermediate gear cluster shafts 56, 58, and 60 with their respective pinions and gears are also provided. It will be further understood that gear cluster shafts 44, 54, and 62 shown in FIG. 7 together with the further gear cluster shafts 56, 58, and 60 have their axes disposed on a circle concentric with the axis 68 of input shaft 32 and spaced apart by distances equal to the radius of the circle, and that the seventh gear cluster shaft 208 has its axis coincident with the center of the circle, i.e. the axis 68.

The intermediate gear cluster shaft 54, and the remaining intermediate gear cluster shafts (not shown), have their ends journaled in bearings 46 and 50 mounted in bearing pockets in end wall portion 16 and bearing plate 190 respectively. The inner end of the initial gear cluster shaft 44 likewise is journaled in a bearing 46 mounted in the end wall portion 16. Bearing plate 190 has an opening 210 formed therethrough coaxial with initial gear cluster shaft 44 and communicating between cavity sections 192, 194, and a bearing 212 is mounted in opening 210. Initial gear cluster shaft 44 is supported by bearing 212 and has an outboard portion 214 extending into cavity section 192. Input gear 216 is mounted on outboard portion 214 in cavity section 192 and meshes with input pinion 40 as shown. Pinion 42 on initial gear cluster shaft 44 meshes with gear 100 on gear cluster shaft 54 with pinion 104 in turn meshing with the respective gear of the next successive intermediate gear cluster shaft.

It will be readily understood that by virtue of the equal center distances between each of the six gear cluster shafts 44, 54, 56, 58, 60, and 62, and the center gear cluster shaft 208, the gear on one of the intermediate gear cluster shafts will mesh with pinion 218 on the center gear cluster shaft 208, and that its gear 220 will in turn mesh with the pinion of another intermediate gear cluster shaft. It will be further understood that the pinion of the next-to-lowest speed intermediate gear cluster shaft will mesh with gear 222 on the final gear cluster shaft 62. It will be seen that the center gear cluster shaft 208 is supported by bearings 225 and 226 mounted in inner surface 22 of end wall portion 16 and bearing plate 190 respectively, and concentric with input shaft 32.

In the illustrated embodiment, gear 222 drives the final gear cluster shaft 62 through slip clutch assembly 224. Thus, gear 222 is rotatably mounted on gear cluster shaft 62 and is spaced from slip clutch member 226 which is secured to gear cluster shaft 62, as by a nut 228 on threaded portion 230 of the shaft 62. Annular undulated flat lead spring 90 is disposed between the facing radial surfaces of gear 222 and member 226 and functions in a manner identical to its function in the embodiment of FIGS. 1, 2 and 3.

Cavity 72 is formed in interior surface 22 of end wall portion 16 coaxial with final gear cluster shaft 62 and extending axially toward exterior surface 20, and has bearing 66 seated in its opening. Outboard end 74 of the final gear cluster shaft 62 is supported by bearing 66 and extends into cavity 72, having output pinion 76 formed thereon. Bearing 64 mounted in bearing plate 190 supports the outer end of the final gear cluster shaft 62.

Cavity 78 is formed in exterior surface 20 of end wall portion 16 coaxial with input shaft 32 and the center gear cluster shaft 208 and extends axially toward the interior surface 22. Cavity 78 thus communicates with cavity 72, as at 80.

*Output shaft 82 is supported within cavity 78 by bearings 86 and 88 and has portion 84 extending outwardly beyond exterior surface 20 of end wall 16. Output gear 232 is secured to output shaft 82 between bearings 86 and 88 and meshes with output pinion 76 through opening 80.*

*It will be seen that as in the case of the previous embodiments, cavity 78 is proportioned to permit insertion of bearings 86, 88 with output shaft 82 and output gear 232 preassembled therewith from the exterior surface 20 of end wall portion 16, bearing 88 engaging shoulder 89 and the assembly being retained within opening 78 by snap ring 87.*

*By virtue of the provision of a seventh gear cluster, the embodiment of FIG. 7 is capable of providing a substantially higher speed reduction ratio than prior gear*

*heads; a specific gear head embodying the construction of FIG. 7 having a diameter of 1.062 inches and an axial length of 1.546 inches provided a speed reduction ratio of 100,097.83:1.*

*It will be seen that all of the embodiments of the invention are characterized by their stability, i.e., ruggedness, and by their ease of assembly, i.e., the capability of assembling the entire output shaft bearing and gear assembly from the exterior of the mechanism as opposed to prior constructions wherein at least the output shaft and output gear were required to be assembled from the interior of the mechanism.*

*While there are illustrated and described specific embodiments of the invention, further modifications and improvements will occur to those skilled in the art and it is desired, therefore, in the appended claims to cover all modifications which do not depart from the spirit and scope of the invention.*

What is claimed is:

1. A miniature gear mechanism comprising: a housing having shell means and end wall means joined to said shell means and forming a first cavity therewith, said end wall means having an exterior surface and an interior surface facing said first cavity, said end wall means having a second cavity formed in said interior surface and communicating with said first cavity, said end wall means having a third cavity formed in said exterior surface and communicating with said second cavity; a gear train disposed in said first cavity and including a final shaft with first gear means thereon in said first cavity and having one end extending into said second cavity; first bearing means supporting said final shaft at a point spaced from said one end thereof thereby defining an outboard portion of said final shaft between said first bearing means and said one end, said outboard portion having second gear means thereon in said second cavity; an output shaft in said third cavity and extending outwardly beyond said exterior surface, said output shaft having third gear means thereon meshing with said second gear means and driven thereby; and second bearing means in said third cavity supporting said output shaft; said third cavity having a diameter greater than that of said second bearing means and said third gear means thereby to permit insertion therein of said second bearing means and output shaft with said third gear means thereon from said exterior surface of said end wall means.

2. The apparatus of claim 1 wherein said end wall means and shell means are integral.

3. The apparatus of claim 1 wherein said second bearing means comprises two bearings respectively disposed on either side of said third gear means.

4. The apparatus of claim 1 further comprising closure means spaced from said interior surface of said end wall means and closing said first cavity, and third bearing means on said closure means supporting said final shaft.

5. The apparatus of claim 1 wherein said second cavity communicates with said third cavity intermediate the ends thereof thereby defining first and second end portions of said third cavity, and wherein said second bearing means comprises two bearings respectively disposed on either side of said third gear means and in said first and second end portions of said third cavity.

6. A miniature gear mechanism comprising: a housing having a shell portion and an end wall portion integrally joined to said shell portion and forming a first cavity therewith, said end wall portion having an exterior surface and an interior surface facing said first cavity, said end wall portion having a second cavity formed in said interior surface communicating with said first cavity and extending toward said exterior surface, said end wall portion having a third cavity formed in said exterior surface and extending toward said interior surface, said second cavity communicating with said third cavity intermediate the ends thereof thereby defining outer and inner end portions of said third cavity; a closure member spaced from said interior surface and extending across said shell portion thereby closing said first cavity; a gear train in said first cavity and including a final shaft with a first gear thereon in said first cavity and having one end extending into said second cavity; a first bearing mounted on said closure member and supporting the other end of said final shaft; a second bearing mounted in said second cavity and supporting said final shaft at a point spaced from said one end thereof thereby defining an outboard portion of said final shaft between said one end thereof and said second bearing, said outboard portion having a pinion formed thereon in said second cavity; an output shaft in said third cavity and extending outwardly beyond said exterior surface, said output shaft having a second gear mounted thereon in said third cavity and meshing with said pinion; and third and fourth bearings respectively supporting said output shaft on either side of said second gear and respectively mounted in said outer and inner end portions of said third cavity; said outer end portion of said third cavity having a diameter larger than said third and fourth bearings and said second gear thereby to permit insertion in said third cavity of said third and fourth bearings with said output shaft and second gear supported therein from said exterior surface of said end wall portion.

7. The apparatus of claim 1 wherein one of said gear means is rotatably mounted on the respective shaft, and further comprising slip clutch means connecting said one gear means to the respective shaft.

8. The apparatus of claim 7 wherein said slip clutch means comprises a driven member secured to the respective shaft and spaced from said one gear means, said driven member and said one gear means having facing radial surfaces, and an annular undulated flat spring surrounding the respective shaft between said driven member and one gear means and resiliently engaging said radial surfaces thereof, said spring exerting a predetermined axial force on said radial surfaces whereby said one gear means normally drives said driven member and the respective shaft through said spring but slips with respect to said driven member when a predetermined load is applied to said output shaft.

9. The apparatus of claim 6 wherein said second gear is rotatably mounted on said output shaft, and further comprising a driven member secured to said output shaft and spaced from said second gear, said driven member and second gear being between said third and fourth bearings, said driven member and second gear having facing radial surfaces, and an annular undulated flat spring surrounding said output shaft between said driven member and second gear and resiliently engaging said radial surfaces thereof, said spring exerting a predetermined axial force on said radial surfaces whereby said second gear normally drives said driven member and output shaft through said spring but slips with respect to said driven member when a predetermined load is applied to said output shaft.

10. The apparatus of claim 1 wherein said output shaft is a hollow sleeve, said third cavity communicating with said first cavity, and further comprising an input shaft coaxially mounted within said sleeve and having one end extending beyond the inner end of said sleeve into said first cavity and its other end extending beyond the outer end of said sleeve, said one end of said input shaft being coupled to said gear train for driving the same, and bearing means supporting said input shaft within said sleeve.

11. The apparatus of claim 1 wherein said end wall means comprises a first portion defining said exterior surface and having said third cavity formed therein, and a second portion defining said interior surface, said second portion being spaced from said first portion and defining said second cavity therewith, said second portion having an opening formed therein communicating between said first and second cavities, said first bearing means being mounted in said opening.

12. A miniature gear mechanism comprising: a housing having a shell portion and an end wall portion connected to said shell portion and forming a cavity therewith, said end wall portion having an exterior surface and an interior surface facing said cavity; a member extending across said cavity spaced from said end wall portion, said member dividing said cavity into a first cavity section remote from said end wall portion and a second cavity section toward said end wall portion, said member having an opening therethrough communicating between said cavity sections; said end wall portion having an opening formed therethrough communicating between said exterior surface and said second cavity section; a gear train disposed in said first cavity section and including a final shaft having one end extending through said opening in said member into said second cavity section; first bearing means mounted in said opening in said member and supporting said final shaft at a point spaced from said one end thereof thereby defining an outboard portion of said final shaft between said first bearing means and said one end, said outboard portion having first gear means thereon in said second cavity section; an output shaft having one end portion in said end wall portion opening and its other end portion extending outwardly beyond said exterior surface of said end wall portion, said one end portion of said output shaft having second gear means thereon meshing with said first gear means and driven thereby; and second bearing means mounted in said opening in said end wall portion and supporting said output shaft; said end wall portion opening being proportioned to permit insertion therein of said output shaft with said second gear means and said second bearing means thereon from said exterior surface.

13. The apparatus of claim 6 wherein said first gear is rotatably mounted on said final shaft, and further comprising a driven member secured to said final shaft in said first cavity and spaced from said first gear, said driven member and first gear having facing radial surfaces, and an annular undulated flat spring surrounding said final shaft between said driven member and first gear and resiliently engaging said radial surfaces thereof, said spring exerting a predetermined axial force on said radial surfaces whereby said first gear normally drives said driven member and final shaft through said spring but slips with respect to said driven member when a predetermined load is applied to said output shaft.

14. The apparatus of claim 1 wherein said gear train comprises seven gear cluster shafts including an initial gear cluster shaft and a final gear cluster shaft, six of said gear cluster shafts having their axes located on a circle and being respectively spaced apart by distances equal to the radius of said circle, the seventh of said gear cluster shafts having its axis on the center of said circle, said gear cluster shafts respectively having gears and pinions thereon which intermesh thereby to drive said final gear cluster shaft from said initial gear cluster shaft, the pinion of said final gear cluster shaft being said second gear means, said initial shaft having an extension portion extending in a direction opposite from said outboard portion of said final shaft and axially beyond the respective ends of the remainder of said gear cluster shafts, said gear on said initial shaft being mounted on said extension portion thereof and being adapted to be driven by fourth gear means coaxial with said output shaft.

15. A miniature gear mechanism comprising: a housing having shell means and end wall means joined to said shell means and forming a first cavity therewith, said end wall means having an exterior surface and an interior surface facing said first cavity, said end wall means having a second cavity formed in said interior surface and communicating with said first cavity, said end wall means having a third cavity formed in said exterior surface and communicating with said second cavity; a closure member spaced from said interior surface and extending across said shell portion thereby closing said first cavity; a first group of seven bearings mounted on said interior surface, six of said first group having their centers respectively located on a circle and being respectively spaced apart by distances equal to the radius of said circle, the seventh one of said first group having its center located on the center of said circle; a second group of seven bearings mounted on said closure member and respectively in axial alignment with said first group of bearings; said end wall means having a second cavity formed therein in axial alignment and communicating with one of said first group of bearings; a gear train in said first cavity comprising seven shafts respectively supported by the bearings of said first and second groups, one of said gear train shafts being a final shaft and being supported by said one bearing of said first group, said final shaft having an outboard portion extending into said second cavity and having a pinion formed thereon in said second cavity; a first gear on said final shaft in said first cavity, another of said gear train shafts being an initial shaft and the remaining gear train shafts being intermediate shafts, said initial and intermediate shafts respectively having pinions and gears thereon which intermesh to drive said first gear and final shaft from said initial shaft; said end wall means having a third cavity formed in said exterior surface in axial alignment with another of said first group of bearings and communicating with said second cavity; an output shaft in said third cavity and extending outwardly beyond said exterior surface, said output shaft having an output gear thereon in said third cavity and meshing with said pinion on said final shaft, and other bearings in said third cavity supporting said output shaft; said third cavity having a diameter greater than that of said other bearings and said output gear thereby to permit insertion therein of said other bearings and output shaft with said output gear thereon from said exterior surface of said end wall means.

16. A miniature gear mechanism comprising: a housing having a shell portion with an open end and an end wall portion integrally joined to the other end of said shell portion and forming a cavity therewith, said end wall portion having an exterior surface and an interior surface facing said first cavity; a first closure member extending across said shell portion intermediate said interior surface and open end and dividing said cavity into a first section remote from said end wall portion and a second section toward said end wall portion; a second closure member extending across said shell portion adjacent said open end and closing said first cavity section; a first group of seven bearings mounted on said interior surface, six of said first group having their centers respectively located on a circle and being respectively spaced apart by distances equal to the radius of said circle, the seventh one of said first group having its center located at the center of said circle; a second group of seven bearings mounted on said first closure member and respectively in axial alignment with said first group of bearings; said end wall portion having a first opening formed in said interior surface extending axially toward said exterior surface, one of said six bearings of said first group being mounted in said first opening; said end wall portion having a second opening formed in said exterior surface extending axially toward said interior surface and in axial alignment with the seventh bearing of said first group, said first opening communicating with said second opening intermediate its ends; a gear train in said second cavity section comprising seven shafts respectively supported by the bearings of said first and second groups, one of said gear train shafts being a final shaft and being supported by said one bearing of said first group, said final shaft having an outboard portion extending into said first opening and having an output pinion formed thereon in said first opening; a first gear on said final shaft in said second cavity section; said first closure member having an opening formed therethrough communicating between said first and second cavity sections, one of said second group of bearings in alignment with another one of said bearings of said first group being mounted in said first closure member opening, another of said gear train shafts being an initial shaft and being supported by said one bearing of said second group, said initial shaft having an outboard portion extending into said first cavity section; an input gear in said first cavity section on said outboard portion of said initial shaft; said initial shaft having a pinion thereon in said second cavity section, each of the remaining gear train shafts having a gear and pinion thereon in said second cavity section, said gears and pinions meshing to drive said final shaft from said initial shaft with a predetermined speed reduction; said second closure member having an opening formed therethrough coaxial with said second opening in said end wall portion and adapted to receive an input shaft having an input pinion thereon for meshing with said input gear to drive the same; an output shaft coaxially in said second opening in said end wall portion and extending outwardly beyond said exterior surface, said output shaft having an output gear thereon in said second opening and meshing with said output pinion; and a pair of bearings in said second opening on either side of said output gear supporting said output shaft; said second opening being proportioned to permit insertion therein of said pair of bearings and output shaft with said output gear thereon from said exterior surface.

17. In a miniature gear mechanism, a housing having axially spaced end wall portions, and a gear train in said housing comprising seven shafts extending axially between said end wall portions and respectively journaled therein, six of said shafts having their axes disposed on a circle and being respectively spaced from each other by distances equal to the radius of said circle, the seventh of said shafts having its axis located on the center of said circle, one of said shafts being an output shaft and another being an input shaft, each of said shafts having a pinion and gear thereon, said pinions and gears intermeshing to drive said input shaft from said input shaft, said output shaft having an extension portion extending axially beyond the ends of the remainder of said shafts, said pinion on said output shaft being mounted on said extension portion thereof and being adapted to mesh with an output gear, said input shaft having an extension portion extending in the direction opposite from said extension portion of said output shaft and axially beyond the respective ends of the remainder of said shafts, said gear on said input shaft being mounted on said extension portion thereof and being adapted to mesh with an input pinion.

18. The apparatus of claim 17 wherein said extension portion of said output shaft extends through one of said end wall portions and has an outboard portion with said output pinion thereon, and wherein said extension portion of said input shaft extends through one of said end wall portions and has an outboard portion with said input gear thereon.

References Cited by the Examiner

The following references, cited by the Examiner, are of record in the patented file of this patent or the original patent.

UNITED STATES PATENTS

| | | | |
|---|---|---|---|
| 2,762,232 | 9/1956 | Bade | 74—421 |
| 2,883,880 | 4/1959 | Merkle | 74—421 |
| 2,936,644 | 5/1960 | Miller | 74—421 |
| 2,943,507 | 7/1960 | Bachman | 74—421 |
| 3,011,358 | 12/1961 | Moore | 74—421 X |

DAVID J. WILLIAMOWSKY, *Primary Examiner.*

L. H. GERIN, *Assistant Examiner.*